(12) United States Patent
Silverstein et al.

(10) Patent No.: US 11,288,503 B2
(45) Date of Patent: Mar. 29, 2022

(54) SYSTEMS AND METHODS FOR IMAGE ADJUSTMENT BASED ON PUPIL SIZE

(71) Applicant: Facebook Technologies, LLC, Menlo Park, CA (US)

(72) Inventors: Barry David Silverstein, Kirkland, WA (US); Bo Zhang, Kenmore, WA (US); Yijing Fu, Redmond, WA (US)

(73) Assignee: FACEBOOK TECHNOLOGIES, LLC, Menlo Park, CA (US)

(*) Notice: Subject to any disclaimer, the term of this patent is extended or adjusted under 35 U.S.C. 154(b) by 23 days.

(21) Appl. No.: 16/673,348

(22) Filed: Nov. 4, 2019

(65) Prior Publication Data
US 2021/0133440 A1    May 6, 2021

(51) Int. Cl.
*G06K 9/00* (2006.01)
*G06T 7/90* (2017.01)
*G06F 3/01* (2006.01)
*G06T 7/20* (2017.01)

(52) U.S. Cl.
CPC ......... *G06K 9/00604* (2013.01); *G06F 3/013* (2013.01); *G06T 7/20* (2013.01); *G06T 7/90* (2017.01)

(58) Field of Classification Search
CPC ............................. G06K 9/00604; G06F 3/013
See application file for complete search history.

(56) References Cited

U.S. PATENT DOCUMENTS

| | | | |
|---|---|---|---|
| 2013/0063582 A1* | 3/2013 | Choi ................ | G06K 9/00604 348/78 |
| 2016/0000316 A1* | 1/2016 | Copland ............. | A61B 3/103 351/221 |
| 2018/0268779 A1 | 9/2018 | Nakashima et al. | |
| 2019/0226830 A1 | 7/2019 | Edwin et al. | |
| 2019/0265785 A1* | 8/2019 | Ho ........................ | G06F 3/147 |
| 2020/0225481 A1 | 7/2020 | Bodiya | |

FOREIGN PATENT DOCUMENTS

WO    WO-2019/224740 A1    11/2019

OTHER PUBLICATIONS

International Search Report and Written Opinion on related PCT Appln. PCT/US2020/054623 dated Jan. 12, 2021.

* cited by examiner

*Primary Examiner* — Edward Park
(74) *Attorney, Agent, or Firm* — Foley & Lardner LLP (57) ABSTRACT

Systems and methods for adjusting an image based on pupil size are disclosed. Particularly, a system for adjusting an image being presented on a display includes a processor. The processor is configured to identify a size of a pupil of a user viewing an image presented on the display, determine an intensity map based at least on the size of the pupil, and adjust the intensity values of at least a portion of the image using the intensity map. The intensity map indicates an amount of adjustment to intensity values of at least a portion of the image being displayed.

20 Claims, 7 Drawing Sheets

SYSTEMS AND METHODS FOR IMAGE ADJUSTMENT BASED ON PUPIL SIZE

FIELD OF THE DISCLOSURE

The present disclosure relates generally to display systems. More particularly, the present disclosure relates to systems and methods for image adjustment based on pupil size in di splay systems.

BACKGROUND

Display systems are used to present an image to a user. Display systems may be implemented in augmented reality (AR) and/or virtual reality (VR) systems. A colored image presented on the display has a plurality of pixels where each pixel includes a red, green, and blue light that each have different intensity values depending on the color being displayed at the respective pixel. An observer may perceive a color that varies from the intended color, which creates distortions or imperfections in the image observed by the user.

SUMMARY

Systems and methods for adjusting an image based on pupil size are disclosed herein. In one implementation, a system includes A non-transitory computer-readable storage medium coupled to one or more processors, the computer-readable storage medium having instructions encoded thereon that, when executed by the one or more processors, cause the one or more processors to, identify a size of a pupil of a user viewing an image presented on a display, determine an intensity map based at lease on the size of the pupil, and adjust the intensity values of at least a portion of the image using the intensity map. The intensity map indicates an amount of adjustment to intensity values of at least the portion of the image. In some embodiments, the system includes an eye tracking system configured to detect the size of the pupil. In some embodiments, the eye tracking system is further configured to detect a gaze angle of the user, and wherein determining the intensity map includes determining the intensity map based at least on the size of the pupil and a gaze angle of the user. In some embodiments, identifying the size of the pupil includes estimating the size of the pupil based at least on ambient light and an intensity of the image presented on the display. In some embodiments, determining the intensity map includes selecting the intensity map from a plurality of intensity maps, the intensity map corresponding to the size of the pupil, where each of the plurality of intensity maps corresponds to a different size of the pupil.

In some embodiments, determining the intensity map includes selecting a first intensity map from a plurality of intensity maps, the first intensity map corresponding to a smaller size of the pupil and interpolating the intensity map based at least on the size of the pupil and the first intensity map. In some embodiments, determining the intensity map includes selecting a second intensity map from the plurality of intensity maps, the second intensity map corresponding to a larger size of the pupil and interpolating the intensity map based on the size of the pupil, the first intensity map, and the second intensity map. In some embodiments, the interpolation includes either a linear interpolation algorithm or a weighted interpolation algorithm. In some embodiments, the intensity map indicates a predetermined amount of adjustment to red, green, and blue intensity values of the image to correspond to red, green, and blue intensity values of a reference image.

In some embodiments, the display includes a waveguide and a projection device, the projection device configured to project a light beam toward the waveguide, and the waveguide configured to receive the light beam and present the image on the display. In some embodiments, adjusting the image includes transmitting a signal to the projection device of the display, the signal configured to cause the projection device to adjust at least a portion of a light beam in order to adjust red, green, and blue intensity values corresponding to the portion of the image presented on the display.

Another implementation of the present disclosure is related to a method for adjusting an image on a display of a wearable device. In some embodiments, the wearable device is a head-mounted device (HMD). The method includes determining, by a processor of the wearable device, a size of a pupil of a user viewing an image presented on a display, determining, by the processor, an intensity map based at least on the size of the pupil, and adjusting at least a portion of the image using the intensity map. In some embodiments, determining the intensity map includes selecting, by the processor from a memory, the intensity map from a plurality of intensity maps, where each of the plurality of intensity maps corresponds to a respective size of a pupil. In some embodiments, determining the intensity map includes selecting, by the processor from a memory, a first intensity map from a plurality of intensity maps, the first intensity map corresponding to a smaller size of the pupil, and interpolating the intensity map based at least on the size of the pupil and the first intensity map. In some embodiments, determining the intensity map further includes selecting a second intensity map from the plurality of intensity maps, the second intensity map corresponding to a larger size of the pupil and interpolating the intensity map based on the size of the pupil, the first intensity map, and the second intensity map. In some embodiments, determining the intensity map further comprises selecting the intensity map based at least on the size of the pupil and a gaze angle of the user. In some embodiments, the intensity map is a pre-configured map that indicates an amount of red, green, and blue intensity values for adjusting the portion of the image to correspond to red, green, and blue intensity values of a reference image. In some embodiments, presenting the image on the display includes projecting, via projection device, a light beam toward a waveguide display, and presenting, on the waveguide display, the image corresponding the light beam. In some embodiments, adjusting the image includes transmitting a signal to the projection device of the display, wherein the signal is configured to cause the projection device to adjust at least a portion of a light beam in order to adjust red, green, and blue intensity values at the portion of the image presented on the display.

Another implementation of the present disclosure is related to a head mounted display (HMD). The HMD includes a housing configured to attach to a head of a user, a display disposed within the housing configured to present an image to the user, one or more processors disposed within the housing, and a non-transitory computer readable medium. The computer-readable storage medium having instructions encoded thereon that, when executed by the one or more processors, cause the one or more processors to determine an intensity map based at least on information regarding a size of a pupil of the user, where the intensity map indicates an amount of adjustment to red, green, and blue intensity values of at least a portion of the image, and adjust the red, green and blue intensity values of at least the portion of the image using the intensity map.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Various aspects of the present disclosure relate to systems and methods for adjusting an image presented on a display. In some embodiments, a system for image adjustment includes a computing system and a display configured to present images thereon. Due to a pupil size (and/or location of the pupil relative to the display) of a user viewing the images on the display, the images may have imperfections that are perceived by the user. Particularly, waveguide displays can display images that exhibit randomized non-uniformity in the image due to the nature of how images are presented on waveguide displays. Waveguide displays may present the image by scattering the light beam in a predetermined manner. As a result of the scattering, which is not always uniform, the image may be perceived differently by a user based on a size of pupil of the user and/or the position (and thereby gaze angle) of an eye (or eyes) of the user. As a result, image adjustment may be used to correct the image based at least on the size of the pupil. As such, the computing system is configured to identify a size of the pupil and adjust the image according to the identified size in order to provide some correction to the images. In some embodiments, the system may estimate the size of the pupil based on the ambient light sensed by one or more sensors in the system. In some embodiments, the system may include an eye tracking system that is configured to detect the size of the pupil. In some embodiments, the eye tracking system is also configured to detect a gaze angle or position of the eye and pupil.

In some embodiments, the computing system uses the identified pupil size in order to determine a preconfigured map that indicates an amount of adjustment to intensity values (e.g., red, blue, and green intensity values) of at least a portion of the image (e.g., an intensity map). In some embodiments, the computing system may determine the intensity map by selecting or accessing the intensity map from a plurality of intensity maps stored in a memory device. In some embodiments, the computing system may determine the intensity map also based on the gaze angle of the eye of the user.

The computing system uses the intensity map to adjust the intensity values of at least a portion of the image being presented (or about to be presented). That is, the computing system may use the intensity map to generate a signal that causes the image being displayed to adjust one or more intensity values of the portion of the image. For example, the computing system may identify the size of the pupil of the viewer to be 2.5 millimeters (mm), the processor may then access an intensity map that corresponds to the pupil size of 2.5 mm from the memory device. The computing system may communicate with the display (e.g., or a projection device of the display) in order to adjust the intensity values of the image in accordance with the intensity map. In this way, the system allows for an image being presented to a viewer to be actively adjusted based on the size of the pupil of a viewer, which increases the perceived quality of the image.

Figure 1:
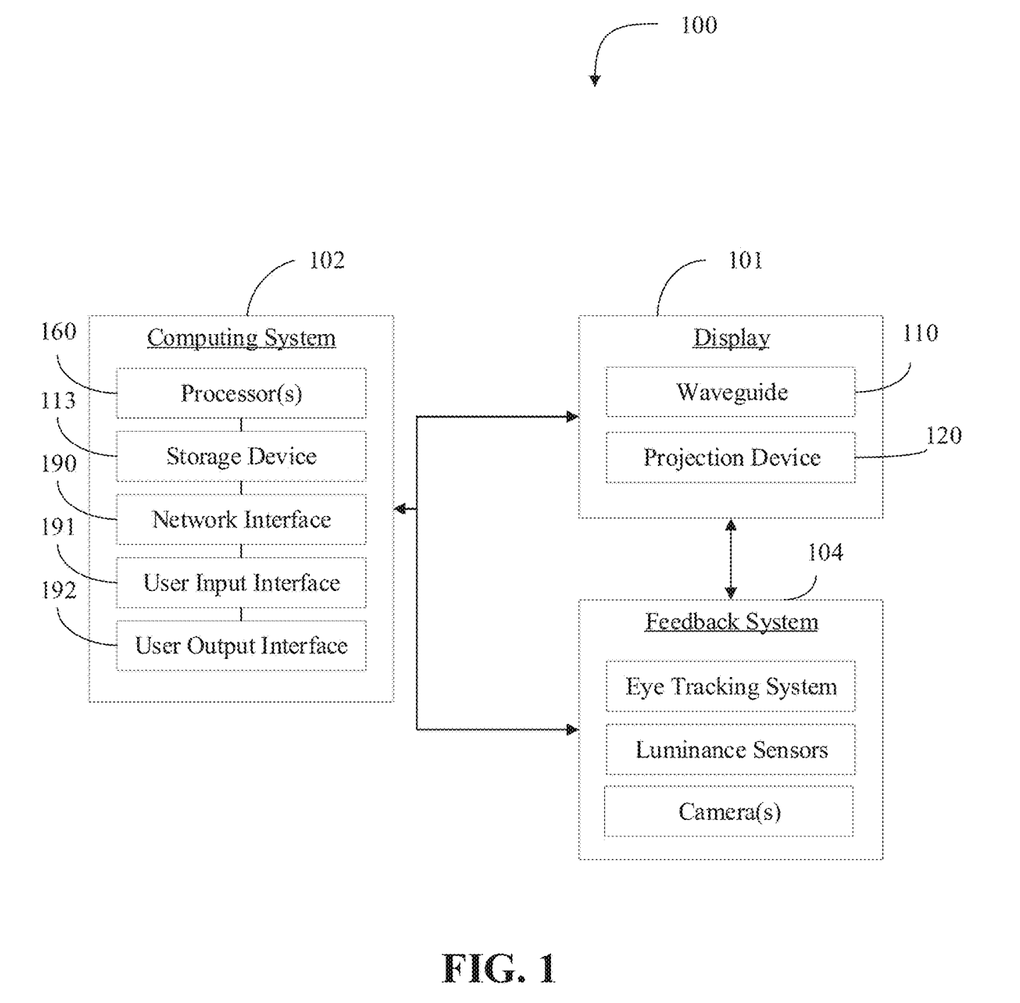
FIG. 1 is a block diagram of a display system in accordance with an illustrative embodiment.

Referring now to FIG. 1, a block diagram of a system 100 for image adjustment is depicted in accordance with an illustrative embodiment. System 100 can be implemented using HMD system 200 described with reference to FIG. 2. System 100 can incorporate features of and be used to implement features of virtual reality (VR), mixed reality (MR), and augmented reality (AR) systems. The system 100 includes a display 101, and a computing system 102. Various operations described herein can be implemented on one or more computer systems 102.

Computing system 102 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 102 can be implemented to provide VR, AR, MR experience. In some embodiments, the computing system 102 can include computer components such as one or more processors 160, storage device 113, network interface 190, user input interface 191, and user output interface 192.

Network interface 190 can provide a connection to a wide area network (e.g., the Internet) to which WAN interface of a remote server system is also connected. Network interface 190 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input interface 191 allows for the computing system 102 to receive signals from input devices; computing system 102 can interpret the signals as indicative of particular user requests or information. User input interface 191 can include an interface terminal(s) configured to receive signals from the feedback system 104 (e.g., or components thereof), a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output interface 192 allows for the computing system 102 to relay or transmit information to one or more output devices. For example, an output device can include the display 101 and the user output interface may be configured to transmit signals to the display 101 in order to cause the display 101 to present images generated by or delivered to computing system 102. The display 101 can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used to interface with the computing system via the user input interface 191 and the user output interface 192. User output interface devices 192 can also allow for the computing system 102 to relay or transmit information to other output devices in addition to or instead of the display 101. Examples of other output devices include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 160 can provide various functionality for computing system 102, including any of the functionality described herein as being performed by a server or client, or other functionality associated with message management services.

It will be appreciated that computing system 102 is illustrative and that variations and modifications are possible. Computer systems used in connection with the present disclosure can have other capabilities not specifically described here. Further, while computing system 102 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

The display 101 is configured to display, provide or present an image. In some embodiments, the display includes one or more devices for presenting an image (e.g., waveguide, projector, a mirror-based projector, liquid crystal display (LCD), light emitting diode (LED)). In some embodiments, the display may include a waveguide 110 and a projection device 120. In some embodiments, the projection device 120 is configured to generate and project a light beam that is indicative of an image toward the waveguide. The waveguide 110 is configured to receive the light beam and present the image. The projection device 120 is communicably coupled to the computing system 102. The waveguide 110 may present the image by scattering the light beam in a pre-determined manner. As a result of the scattering, which is not always uniform, the image may be perceived differently by a user based on a size of pupil of the user and/or the position (and thereby gaze angle) of an eye (or eyes) of the user. As a result, image adjustment is used to correct the image based at least on the size of the pupil.

In some embodiments, the system 100 includes one or more feedback systems 104. In some embodiments, a feedback system 104 may be integrated with the display 101. In some embodiments, the feedback system 104 is an eye tracking system. In some embodiments, the feedback system 104 includes a luminance sensor that is configured to sense the intensity of the light, such as between an eye of a user and the display 101. In some embodiments, the system 100 may estimate an amount of luminance between the display 101 and an eye of a user based on the intensity of the image being presented on the display 101. In some embodiments, one or more sensors of the feedback system 104 are connected to the computing system 102 and configured to transmit a signal indicative of a state or position of the display, eye of a user, or ambient light of the system 100.

The eye tracking system can include any function, operation, routine, logic, or instructions executed by system 100 or components thereof to track data regarding eyes of the user, such as a pupil size of the eye or positions and orientations (e.g., gaze directions or angles) of the eye. For example, the eye tracking system can be implemented using at least one of one or more sensors, cameras, or optical elements. For example, the eye tracking system may process eye tracking data from the sensors or cameras in order to determine or detect a pupil size or eye position. In some embodiments, the eye tracking system detects a pupil size of the eye and transmits a signal to the computing system 102 that is indicative of the detected pupil size. In some embodiments, the eye tracking system transmits a signal that is indicative of the raw data/image captured by the eye tracking system to the computing system 102, where the computing system 102 may then process the raw data of an image of the eye in order to identify a size of a pupil of a respective user.

Figure 2:
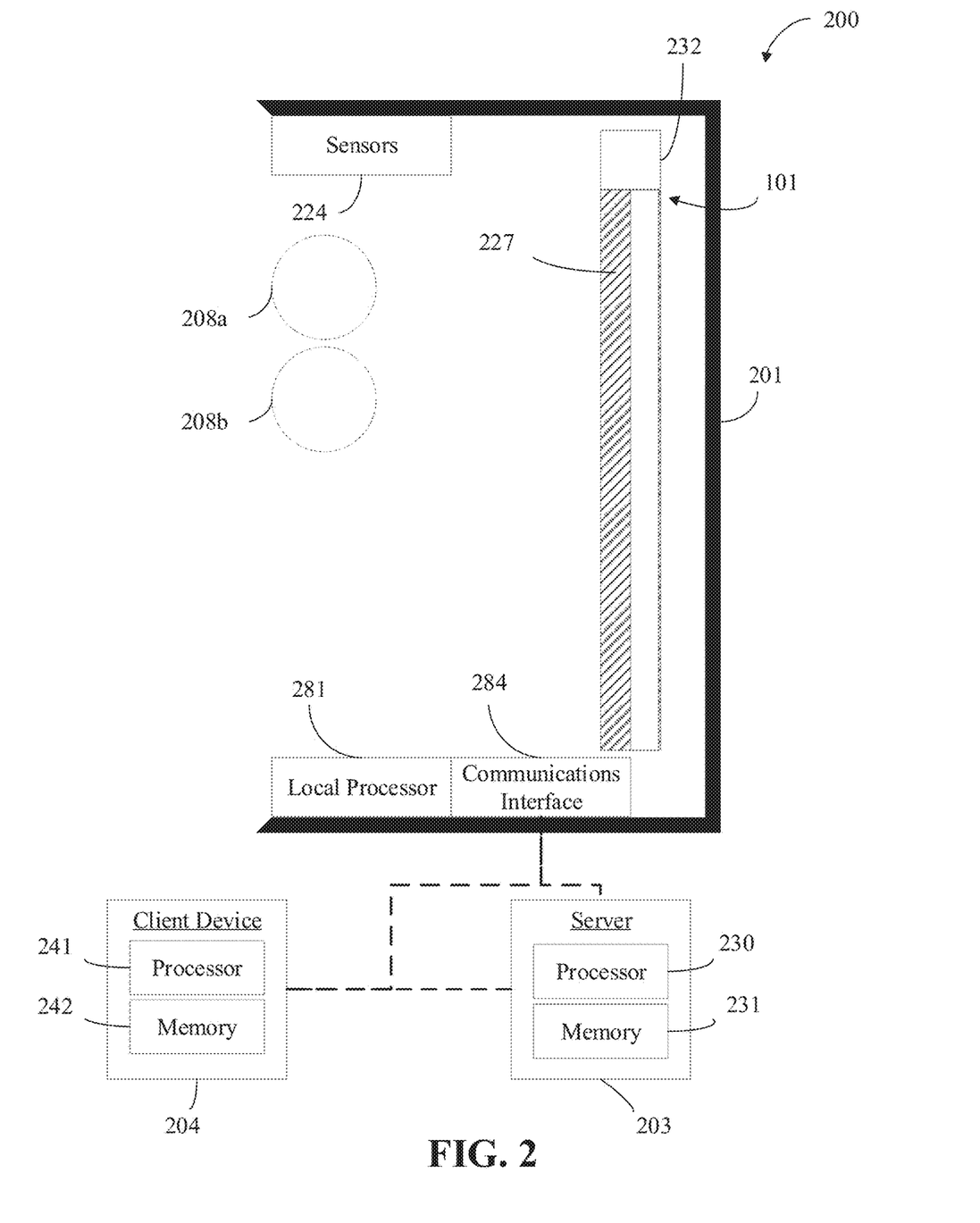
FIG. 2 is a schematic diagram of a head-mounted display (HMD) system in accordance with an illustrative embodiment.

Referring now to FIG. 2, in some implementations, a head mountable device (HMD) system 200 can be used to implement system 100. In some embodiments, HMD may be a head worn display (HWD) or display wearable on the head such as in the form of glasses. In some embodiments, system 100 may be implemented in any wearable or stationary system that utilizes a display. HMD system 200 can include an HMD body (e.g., housing) 201, and a display 101. In some embodiments, the HMD also includes one or more sensors 224. In some embodiments, the one or more sensors 224 may be part of the feedback system 104. The HMD body 201 can have various different features, such as glasses or an audible headset. In some embodiments, sensors 224 can be mounted to or integrated in the HMD body 201.

HMD system 200 may include a local processor 281, which can perform at least some of the functions described with reference to FIG. 1. For example, the local processor 281 may receive data from the sensors 224, the display 101, or, if included, an eye tracking system (not depicted), and process the received date in order to identify a pupil size of an eye of a user. In some embodiments, the local processor 281 performs one or more operations described herein. In some embodiment the local processor 281 works in conjunction with other processors or devices described herein to perform one or more of the operations described herein.

HMD system 200 may include a communications interface 284. The communications interface 284 includes circuitry that can be used to transmit electronic communication signals to and receive electronic communication signals from at least one of a client device 204 or a server 203. The communications interface 284 may include wired or wireless interfaces (e.g., jacks, antennas, transmitters, receivers, transceivers, wire terminals) for conducting data communications with various systems, devices, or networks. For example, communications interface 284 may include an Ethernet card and port for sending and receiving data via an Ethernet-based communications network. In some embodiments, the communications interface 284 can communicate via local area networks (e.g., a building LAN), wide area networks (e.g., the Internet, a cellular network), and/or conduct direct communications (e.g., NFC, Bluetooth). The communications interface 284 may conduct wired and/or wireless communications. For example, communications interface 284 can include one or more wireless transceivers (e.g., a Wi-Fi transceiver, a Bluetooth transceiver, a NFC transceiver, a cellular transceiver). For example, communications interface 284 can establish wired or wireless connections with the at least one of client device 204 or server 203. In some embodiments, communications interface 284 may establish a USB connection with client device 204.

The client device 204 may be any type and form of general purpose or special purpose computing device in any form factor, such as a mobile or portable device (phone, tablet, laptop, etc.), or a desktop or personal computing (PC) device. In some embodiments, the client device 204 includes a processor 241 and a memory 242. In some embodiments, the client device 204 can be a special purpose device, such as in the form of a staging device, which may have computing system or portions thereof. The special purpose device may be designed to be carried by the user while wearing the HMD, such as by attaching client device 204 to clothing or the body via any type and form of accessory attachment. The client device 204 may be used to perform any portion of the image generation, identification of a pupil size, determining an intensity map, and adjusting a presented image using the intensity map described herein. In some embodiments, one or more intensity maps corresponding at least to pupil size may be stored of the client device 204 such as in memory 242 or other storage medium. The HMD can transmit and receive data with client device 204 to leverage client device 204's computing power and resources which may have higher specifications than those of the HMD.

The server 203 can be any type or form of computing device that provides applications, functionality or services to one or more client devices 204 or other devices acting as clients (e.g., the HMD). In some embodiments, the server 203 includes a processor 230 and a memory 231. In some embodiments, the server 203 can be a client device 204. The server 203 may be deployed in a data center or cloud computing environment accessible via one or more networks. The HMD and/or client device 204 may use and leverage the computing power and resources of server 203 via the communications interface 284 and/or the one or more networks. That is, the server 203 may be used to perform any portion of the image generation, identification of a pupil size, determining an intensity map, and adjusting a presented image using the intensity map described herein. In some embodiments, one or more intensity maps corresponding at least to pupil size may be stored on the memory 231 of the server 203. In some embodiments, the server 203 may be used to update the HMD and/or client device 204 with any updated to the applications, software, firmware, executable instructions and/or data on the HMD and/or client device 204.

In some embodiments, the display 101 includes one or more waveguides 227. The waveguides 227 can receive (e.g., in-couple) light corresponding to display images to be presented by the display 101 from one or more projectors or projection devices 232, and output (e.g., out-couple) the display images, such as for viewing by a user of the HMD. The waveguides 227 can perform horizontal or vertical expansion of the received light to output the display images at an appropriate scale. The waveguides may include one or more lenses, diffraction gratings, polarized surfaces, reflective surfaces, or combinations thereof to provide the display images based on the received light. The projection device 232 can include any of a variety of projection devices, such as liquid crystal display (LCD), light emitting diode (LED), organic light emitting diode (OLED), digital micromirror device (DMD), or liquid crystal technology on silicon (LCOS) devices, among others, to generate the light to be provided to the one or more waveguides 227. The projection device 232 may receive the display images from computing system 102. The waveguides 227 may be provided through a display surface (e.g., glass). In some embodiments, the display surface may be at least partially transparent and operate as a combiner (e.g., combining light from a real world environment around the HMD with the light of the outputted display images).

Operation of display 101 and components thereof, such as the waveguides 227 or the projection device 232, can be modified or controlled responsive to an identification of a pupil size of a user viewing the display. For example, computing system 102 may cause the projection device 232 to provide or adjust a light beam indicative of an image to be presented via the waveguide 227 based on a pupil size of one or both eyes of the user. In some embodiments, the computing system 102 may cause the projection device 232 to adjust the light beam indicative of the image based on a pupil size and a pupil location corresponding one or both eyes of the user. In this way, the computing system 102 may adjust of a portion or all of an image based on an identified pupil size. Although FIG. 2 is described with reference to a head mountable device (HMD), in some embodiments, the HMD or housing 201 may be in the form of glasses, head worn displays, or any wearable or stationary display devices.

Figure 3:
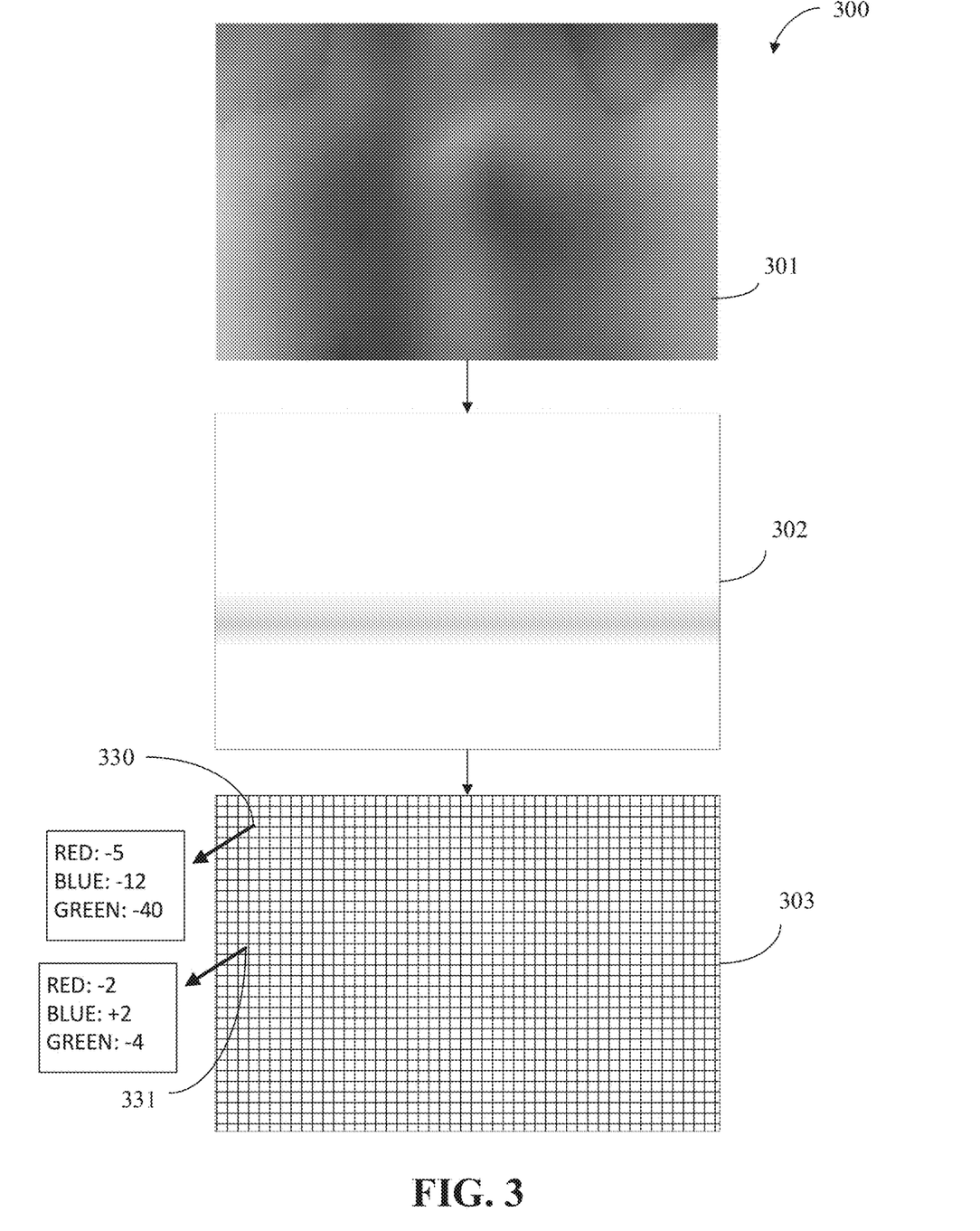
FIG. 3 is a flow diagram depicting a method for adjusting an image in accordance with an illustrative embodiment.

FIG. 3 is a diagram 300 depicting intensity map creation in accordance with an illustrative embodiment. The diagram 300 includes a perceived image 301 of a display, a reference image 302 of the display, and an intensity map 303. In some embodiments, each of the plurality of intensity maps may be created using an electronic or electro-mechanical eye. The electro-mechanical eye may have an adjustable aperture that simulates a size of a pupil of an eye of a user. In some embodiments, the electro-mechanical eye may have an adjustable positioning and orientation system that allows for the electro-mechanical eye to be placed in various positions relative to the display. In one example, the electro-mechanical eye is positioned at a first position relative to the display 101 (e.g., furthest to the left and further toward to top and oriented toward the center of the display in an HMD system). The aperture of the electro-mechanical eye may set to a first discrete size (e.g., 1.5 mm). The display 101 via direction of the image generator 160 or computing system 102 may then present an image that is all white. In this example, the electro-mechanical eye may capture the image as the perceived image 301. That is, the imperfections (e.g., randomized non-uniformities) of the image are the difference in the perceived image 301 and the intended image (e.g., all white). The electro-mechanical eye may be in communication with the computing system 102 (e.g., or other processor) and cause the portions of the image to adjust intensity values (e.g., RGB intensity values) in order to make the image appear white to the electro-mechanical eye at the first position and the first discrete size. In some embodiments, the portions of the image are single pixels. In some embodiments, the portions of the image are clusters of pixels. In some embodiments, the portions of the image are divided into a grid like structure, the grid may include 10×10 pixels for portions. In some embodiments, the grid-like structure may include any variety of number or arrangement of pixels in each portion.

The electro-mechanical eye communicates with the computing system 102 or other processing device to adjust the intensity values (e.g., RGB intensity values) until the image perceived at the mechanical eye is within a predetermined threshold of an acceptable white image (e.g., perceived white light has equal RGB intensities). For example, the reference image 302 may be a substantially white image within a predetermined threshold when the electro-mechanical eye is at the first position with the first pupil size. The reference image 302 may be "substantially" white when the intensity values of each portion or pixel have been manipulated to intensity values that are within a predetermined threshold or after a particular amount of time of adjusting the intensity values in attempt to adjust the perceived image 301 to a white image. In some embodiments, the back of the electro-mechanical eye may include a colorimeter detector configured to capture the non-uniformity of the display (e.g., image 301). In some embodiments, the electromechanical eye, or computing system 102 connected to the electro-mechanical eye may generate a numerical matrix that quantifies the luminance on various portions of the display. The computing system 102 may calculate an amount of adjustment to the intensity values of each corresponding portion of the perceived image 301 using the numerical matrix. In some embodiments, the computing system 102 or other processing device documents an amount of intensity values that where adjusted for each portion in order for the electro-mechanical eye to perceive the reference image 302 instead of the initial perceived image 301. The documented or calculated amount of intensity values for each portion then create the intensity map 303. For example, the intensity map 303 has a plurality of portions (e.g., arranged in a grid) where each portion corresponds to a portion, pixel, or number pixels on the display 101. The plurality of portions of the intensity map 303 each indicate a predetermined amount of adjustment to intensity values.

The intensity map indicates a predetermined amount of adjustment to red, green, and blue intensity values of the image to correspond to red, green, and blue intensity values of the reference image 302. For example, a first portion 330 of the intensity map 303 may include an indication that all pixels corresponding to the first portion 330 need to be adjusted by reducing the red intensity 5 units (e.g., 5%), reducing the blue intensity by 15 units (e.g., 15%), and reducing the green intensity by 40 unites (e.g., 40%) in order for the reference image 302 to be perceived when a pupil is at the first position with the first pupil size. A second portion 331 (e.g., box of the intensity map containing one or more pixels corresponding to the image) may include an indication that all pixels corresponding to the second portion 331 may need to be adjusted by reducing the red intensity 2 units, increasing the blue intensity 2 units, and reducing the green intensity 4 units in order for the reference image 302 to be perceived when a pupil is at the first position with the first pupil size. Thus, the intensity map 303 indicates adjustments to an image presented on a display in order to ensure that the image is accurately perceived by a user when the user's eye is at the first position and at the first pupil size. In some embodiments, the portions (e.g., the boxes of the grid or portions of the matrix) may each correspond to one pixel of an image on the display. In some embodiments, the portions may each correspond to a group (e.g., 10 by 10) of pixels on a display. In some embodiments, the intensity maps are stored as a matrix within the intensity map database. In some embodiments, the intensity maps are stored in a matrix where each portion of the matrix corresponds to a respective portion for the image and includes an indication of the amount change (or baseline) of intensity values for a particular corresponding pupil size and pupil location (e.g., and thereby gaze angle).

Figure 4:
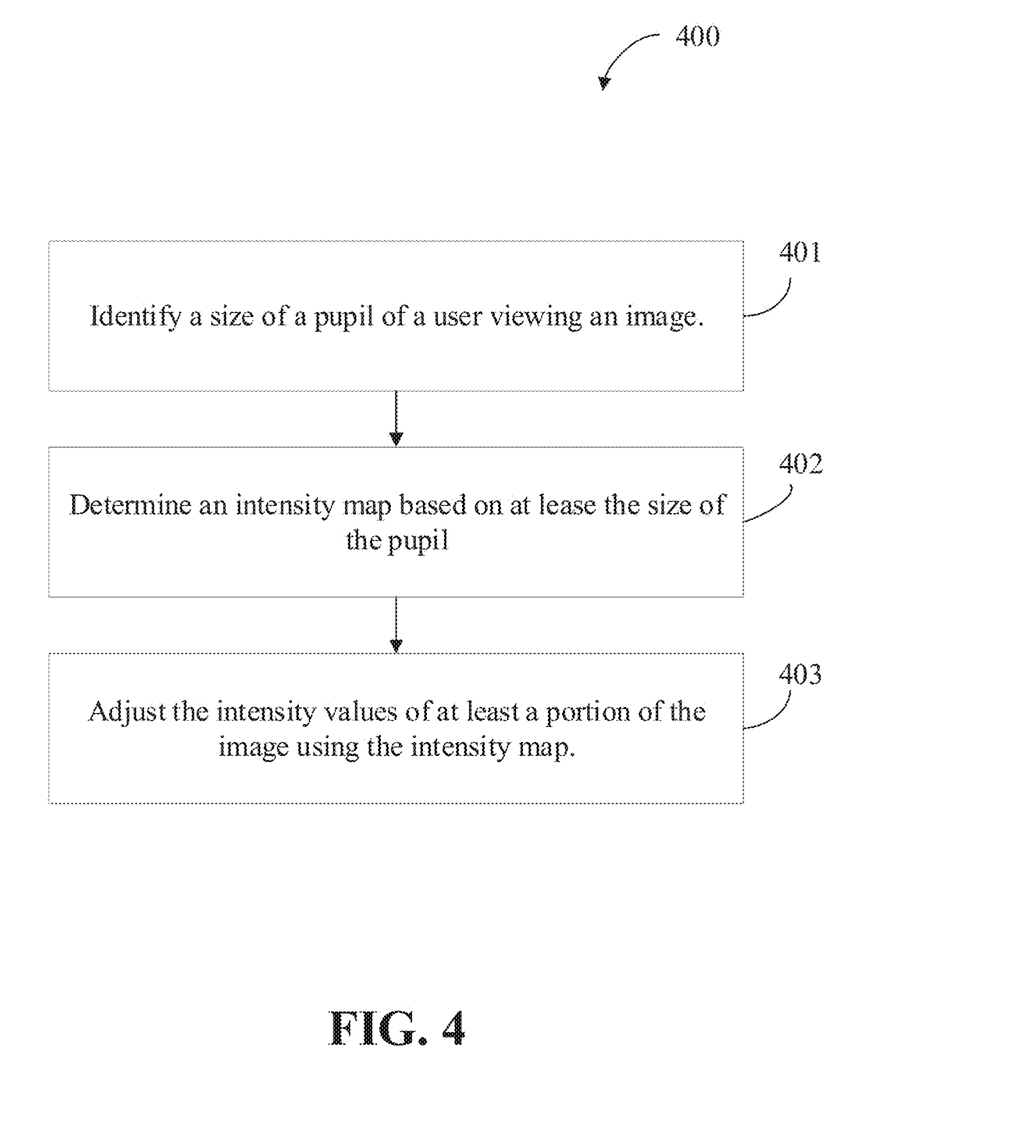
FIG. 4 is a diagram depicting intensity map creation in accordance with an illustrative embodiment.

The intensity map 303 may be stored in the intensity map database of the storage device 113. The electro mechanical eye may then adjust the aperture size to a second discrete size (e.g., 2.0 mm) and repeat the process. This may be repeated until a plurality of intensity maps are created and stored within the intensity map database for example. The plurality of intensity maps may have intensity maps that correspond fifty or more positions of the eye where each position has a ten or more discrete pupil sizes. In some embodiments, the plurality of intensity maps are independent of the position of the eye and each of the plurality of intensity maps corresponds to a discrete pupil size. In some embodiments, the discrete pupil sizes are every half of a millimeter from 1 millimeter to 8 millimeters. In some embodiments, the discrete pupil sizes may be every tenth of a millimeter. In some embodiments, the discrete pupil sizes may be every hundredth of a millimeter. It is to be appreciated that FIG. 4 is meant as one example of how to create an intensity map. In some embodiments, an electro-mechanical eye is not needed and the intensity maps are created based on the user of artificial intelligence and feedback from users. In some embodiments, the maps do not include position information, rather each of the plurality of intensity maps may correspond only to a pupil size. In some embodiments, the intensity maps do not indicate an amount of adjustment, rather the intensity maps may indicate baseline values of each portion or pixel in order to for the reference image to be perceived at each pupil size and/or location.

Referring now to FIG. 4, a flow diagram depicting a method 400 for adjusting an image is illustrated. Reference to FIGS. 1 and 2 may be made while discussing FIG. 3 for demonstration purposes. In brief overview, a size of a pupil of a user viewing an image is identified, an intensity map is determined, and the intensity map is used to adjust at least a portion of the image.

At operation 401, a size of a pupil of user viewing an image is identified. In some embodiments, the computing system 102 identifies the size of the pupil. In some embodiments, the computing system 102 receives an indication of the size of the pupil from an eye tracking system or other processing device. In some embodiments, the eye tracking system detects the size of the pupil via a camera. In some embodiments, the eye tracking system also detects a gaze angle or position of the pupil (or eye) of the user relative to the display.

In some embodiments, the computing system 102 estimates the size of the pupil based on the luminescence intensity of the display 101. For example, in an HMD that is secured to a head of a user may assume that the only light between the display 101 and the eye of the user's eye 208 is the luminance of the display. Thus, the computing system 102 can use information received, accessed, or known about the luminance (e.g., intensity) of the display 101 and interpolate or estimate a size of a pupil of the eye. In some embodiments, the computing system 102 may be connected to one or more sensors 224 that measure the intensity of light present between the eye 208 of the user and the display 101. The computing system 102 may then use the information from the one or more sensors 224 or the known luminance of the display to identify, estimate, or calculate, the size of the pupil of the eye 208. For example, the computing system 102 may perform a linear or weighted interpolation using the information regarding the luminance of the display in order to estimate the pupil size of the user. In some embodiments, the linear or weighted interpolation graph or equation that relates pupil size to luminance of the display may be pre-determined and stored within the storage device 113 or within the computing system 102. In some embodiments, the storage device 113 may include a look-up table that includes a number of luminance intensity values of a display or area between the eye and the display and the respective likely, pre-measured pupil size of an eye under those conditions.

At operation 402, an intensity map based at least on the size of the pupil is determined. In some embodiments, the computing system 102 determines the intensity map based on the size of the pupil identified. For example, the computing system 102 may select or access the intensity map that corresponds to the identified pupil size from a plurality of intensity maps stored within storage device 113. In some embodiments, the computing system 102 may select or access a first intensity map that corresponds to a pupil size larger than or smaller than the identified size of the pupil. The computing system 102 may then interpolate or estimate the intensity map from the first intensity map. In some embodiments, the computing system 102 may select or access a first intensity map that corresponds to a pupil size smaller than the identified size of the pupil and a second intensity map that corresponds to a pupil size larger than the identified size of the pupil. The computing system 102 may then interpolate or estimate the intensity map using a linear or weighted interpolation between the first intensity map and the second intensity map. For example, the plurality of intensity maps stored within storage device 113 may each correspond to a discrete pupil size (e.g., 2.5 mm, 3.0 mm, 3.5 mm, 4.0 mm, 4.5 mm, 5.0 mm, etc.). In one example, where the identified size of the pupil is 2.5 mm, the computing system 102 may access an intensity map that corresponds to a 2.5 mm pupil size. In another example, where the identified size of the pupil is 2.7 mm, the computing system 102 may access the intensity map that corresponds to a 2.5 mm pupil size and interpolate or estimate an intensity map for a 2.7 mm pupil. In another example, where the identified size of the pupil is 2.7 mm, the computing system 102 may access the intensity map that corresponds to a 2.5 mm pupil size and access the intensity map that corresponds to a 3.0 mm pupil size and interpolate or estimate an intensity map for a 2.7 mm pupil size using the intensity map corresponding to the 3.0 mm pupil size and the intensity map corresponding to the 2.5 mm pupil size. For example, one example implementation of determining the intensity map based on the size of the pupil of the eye 208 is described below in reference to FIG. 5.

In some embodiments, the computing system 102 determines the intensity map based on the size of the pupil of the eye 208 and a position or gaze angle of the eye 208. For example, in some embodiments, each of the plurality of maps stored in the storage device 113 may corresponds to a position of the eye and a pupil size. In some embodiments, the plurality of maps may include a first set of intensity maps and a second set of intensity maps. In this example, each of the first set of intensity maps may correspond to a pupil size and each of the second set of intensity maps may correspond to a position or gaze angle of the eye. In an example, where the computing system 102 identifies the eye to be at a first position relative to the display and have a first pupil size, the computing system 102 may access, determine, or select the intensity map that corresponds to the first position and the first pupil size. In another example, the computing system 102 may access four intensity maps and interpolate them in order to determine the intensity map. For example, the computing system 102 may identify the eye to be at a first position (e.g., at a position 1.5) and have a first pupil size (e.g., 2.7 mm). The computing system 102 may then access from the plurality of intensity maps a first intensity map that corresponds to a second position that is adjacent to the first position (e.g., at position 1) and a pupil size smaller than the identified pupil size (e.g., 2.5 mm), a second intensity map that corresponds to a third position that is adjacent to the first position (e.g., at position 2) and a pupil size smaller than the identified pupil size (e.g., 2.5 mm), a third map that corresponds to the second position that is adjacent to the first position (e.g., at position 1) and a pupil size larger than the identified pupil size (e.g., 3.0 mm), a second intensity map that corresponds to a third position that is adjacent to the first position (e.g., at position 2) and a pupil size larger than the identified pupil size (e.g., 3.0 mm). The computing system 102 may then interpolate the first, second, third, and fourth intensity maps in order to determine the intensity map. For example, one example implementation of determining the intensity map based on the size of the pupil of the eye 208 and a position or gaze angle of the eye 208 is described below in reference to FIG. 6.

At operation 403, intensity values of at least a portion of image are adjusted using the intensity map. In some embodiments, the computing system 102 (e.g., or the image generator 160) adjusts the intensity values of at least the portion of the image using the intensity map. For example, the intensity map may indicate for one or more portions of the image that the intensity values need to be adjusted by an amount in order to improve the image quality. In one example, the intensity map indicates that a first portion (e.g., a first 10 by 10 block of pixels in the top left corner of the display) needs to reduce the red intensity by 10% (e.g., or by 10 units), reduce the blue intensity by 15% (e.g., or by 15 units), and increase the green intensity by 5% (e.g., of by 5 units). In this example, the image generator 160 or computing system 102 may change the corresponding intensity values of the first portion of an image being or about to be displayed by the amounts indicated in the intensity map. In this way, an image on a display may be adjusted based at least on pupil size, which increases the presentation quality of images and thereby user experience.

Figure 5:
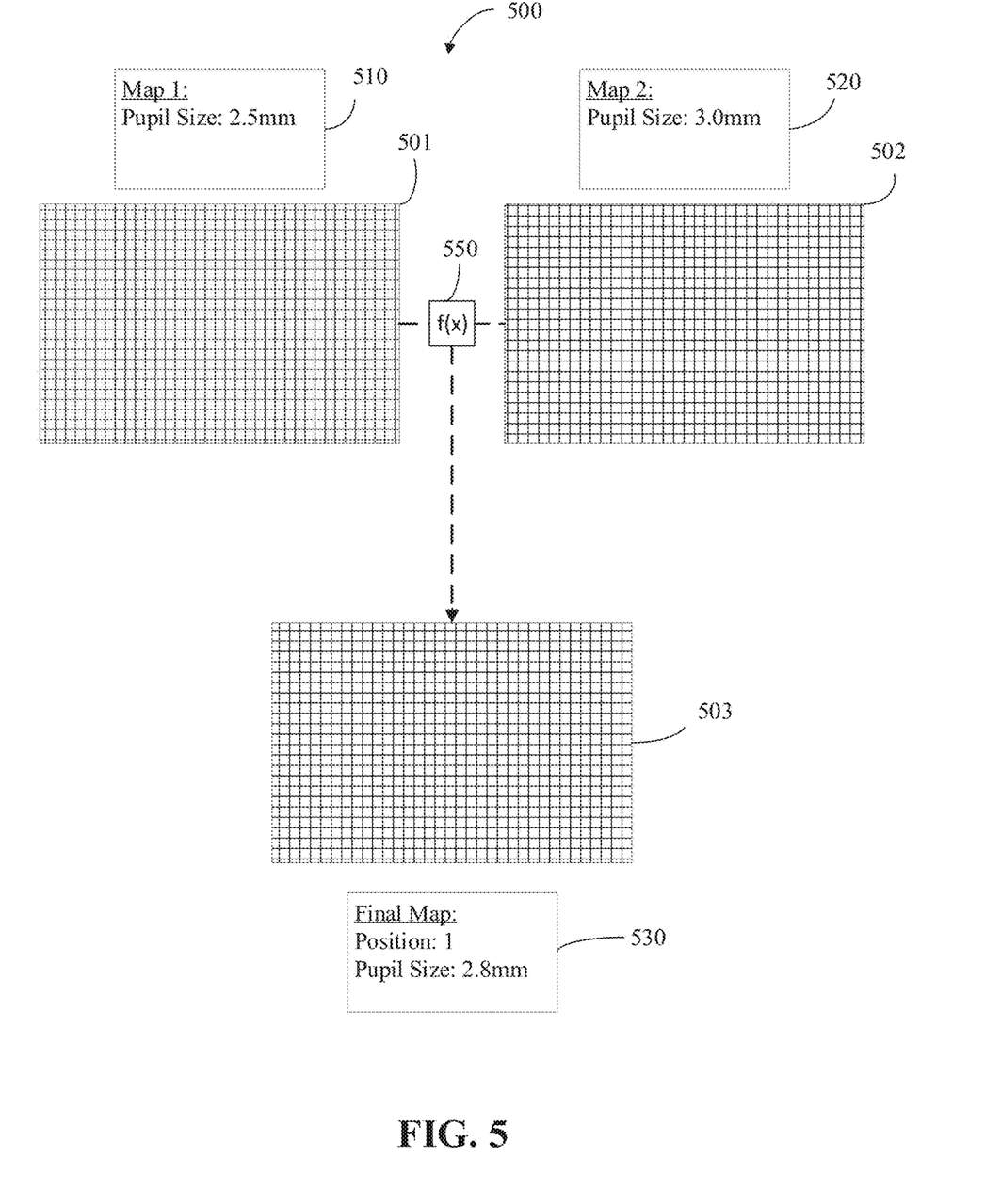
FIG. 5 depicts a diagram of interpolating an intensity map in accordance with an illustrative embodiment.

FIG. 5 depicts a diagram 500 of interpolating an intensity map in accordance with an illustrative embodiment. The diagram 500 includes a first intensity map 501 that corresponds to a pupil size of 2.5 mm and a second intensity map 502 that corresponds to a pupil size of 3.0 mm. The diagram 500 also includes an interpolated final intensity map 503 that corresponds to a pupil size of 2.8 mm. That is, in an example, the computing system 102 has identified a pupil size of an eye of a user viewing the display to be 2.8 mm. The computing system 102 then accessed the first intensity map 501 and the second intensity map 502. At operation 550, the first intensity map 501 and the second intensity map 502 are interpolated together in order to create the intensity map 503. Operation 550 may include a linear interpolation or a weighted interpolation. The inputs of operation 550 may include the first intensity map 501 (e.g., a first matrix of intensity values), the corresponding pupil size of the first intensity map 510 (e.g., 2.5 mm), the second intensity map 502 (e.g., a second matrix of intensity values), a corresponding pupil size of the second intensity map 520 (e.g., 3.0 mm), and an identified pupil size (e.g., 2.8 mm). The operation 550 then outputs the final intensity map 503 corresponding to the identified pupil size (e.g., 2.8 mm). The final intensity map 503 may then be used by the computing system 102 (e.g., and/or image generator 160) to adjust the image.

Figure 6:
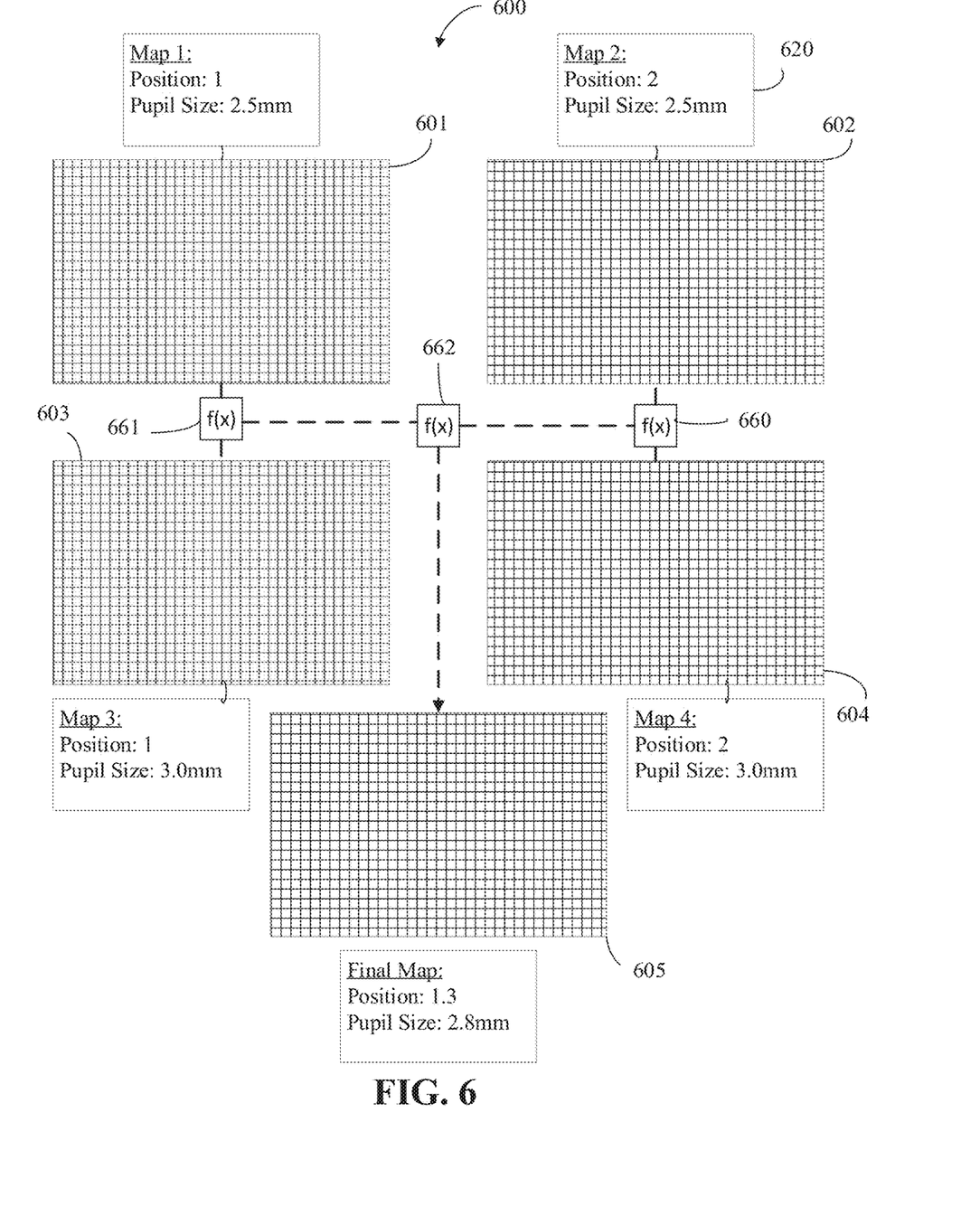
FIG. 6 depicts a diagram of interpolating an intensity map in accordance with an illustrative embodiment.

FIG. 6 depicts a diagram 600 of interpolating an intensity map in accordance with an illustrative embodiment. The diagram 600 includes four intensity maps and an intensity map 605. A first intensity map 601 corresponds to a first position (e.g., position 1) of the eye and a first pupil size (e.g., 2.5 mm). A second intensity map 602 corresponds to a second position (e.g., position 2) and the first pupil size (e.g., 2.5 mm). A third intensity map 603 corresponds to the first position (e.g., position 1) and a second pupil size (e.g., 3.0 mm). A fourth intensity map 604 corresponds to the second position (e.g., position 2) and the second pupil size (e.g., 3.0 mm). In this example, the computing system 102 identified the location of the eye to be at a position (e.g., position 1.3) between the first and second positions and to have a pupil size of 2.8 mm. Thus, the computing system 102 accesses or selects from the plurality of intensity maps the four (or more) discrete intensity maps that adjacent to the identified position and pupil size in order to determine an intensity map that corresponds to the identified position and pupil size (e.g., the final intensity map 605).

In this example, the computing system 102 may interpolate the first intensity map 601 and the third intensity 603 map together at process 661 in order to create an intensity map that corresponds to the pupil size (e.g., 2.8 mm) and the first position. The computing system 102 may also interpolate the second intensity map 602 and the fourth intensity map 604 at process 660 in order to create an intensity map that corresponds to the pupil size (e.g., 2.8 mm) and the second position. The computing system 102, at process 662, may interpolate the intensity map that corresponds to the pupil size (e.g., 2.8 mm) and the first position from process 661 and the intensity map that corresponds to the pupil size (e.g., 2.8 mm) and the second position from process 660 in order to generate, determine, or estimate the intensity map 605 that corresponds to the identified position (e.g., position 1.3) and the identified pupil size (e.g., 2.8 mm). Similar to FIG. 5, each of the interpolations may be linear or weighted interpolations. It is also to be appreciated that FIG. 6 is meant by way of example, and in some embodiments, the order in which the interpolation of the four or more graphs may be different (e.g., interpolate position first then pupil size).

Figure 7:
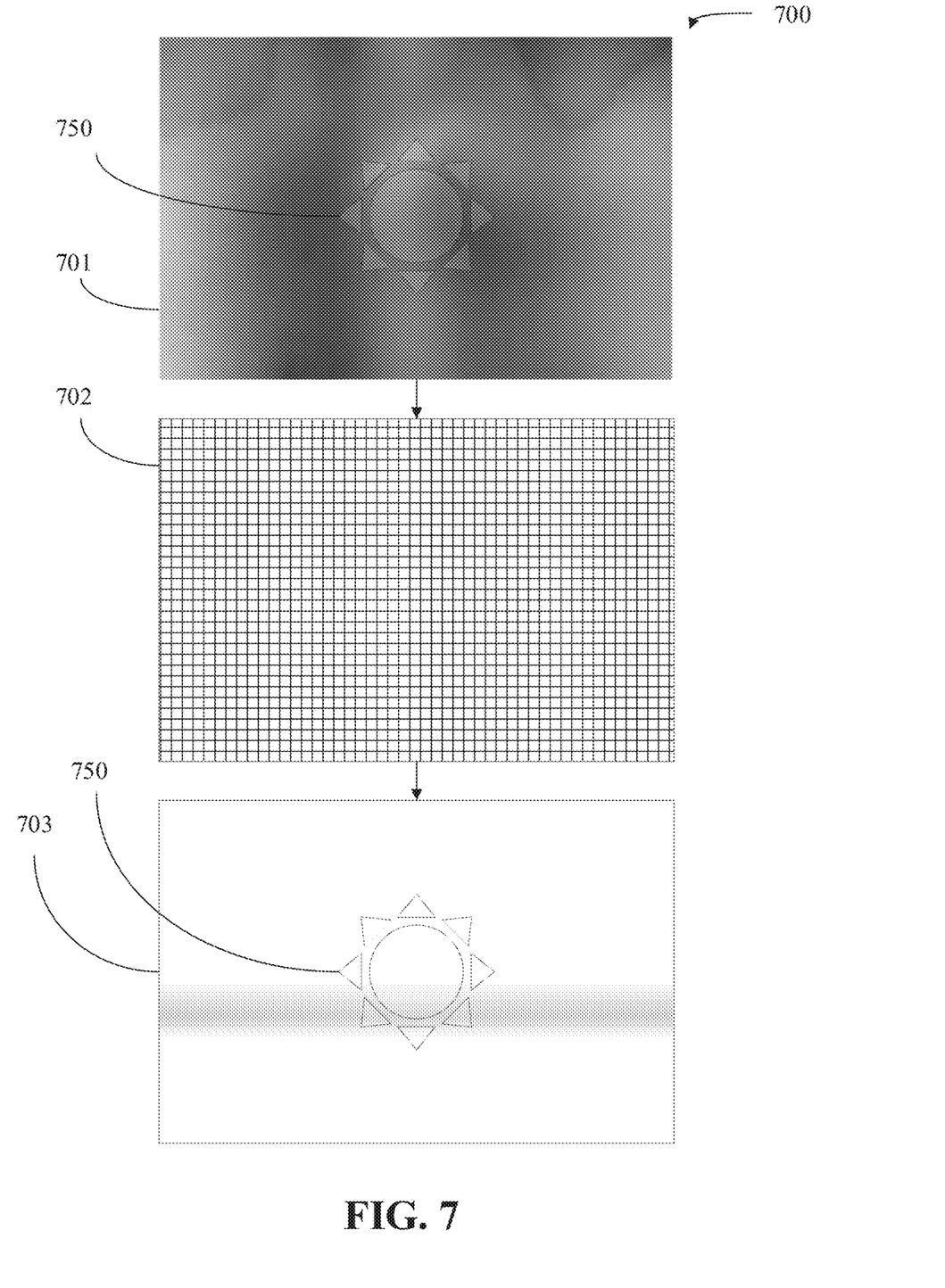
FIG. 7 depicts a diagram of adjusting an image in accordance with an illustrative embodiment.

FIG. 7 depicts a diagram 700 of adjusting an image in accordance with an illustrative embodiment. In some embodiments, the computing system 102 (e.g., or image generator 160) receives or generates an image to be presented on the display 101. For example, the image may include an image of a sun 750. In a first image 701, the sun 750 is presented on the display 101 but has imperfections that are due at least to the size of a pupil of the viewer. The computing system 102 uses a determined intensity map 702 in order to adjust the first image such that the user perceives the image as intended (e.g., with minimal imperfections). The computing system 102 (e.g., via the image generator 160) then adjusts the intensity values of one or more portions of the image using the intensity map 702. For example, the intensity map 702 (e.g., and matrix of values) may be super imposed onto the first image 701 (e.g., or image data corresponding to the first image) such that the intensity values of each portion of the first image are adjusted by the amount indicated within the intensity map 702. In some embodiments, each portion of the first image 701 is adjusted by an amount of red intensity adjustment, an amount of blue intensity adjustment, and an amount of green intensity adjustment. As a result of the adjustment, an adjusted image 703 may then be perceived by the user. The adjusted image 702 more accurately depicts the intended image of the sun 750. In some embodiments, the computing system 102 adjusts the first image 701 using the intensity map 702 before it is presented on the display. In some embodiments, the computing system 102 adjusts the image continuously (or almost continuously) by monitoring the position and size of the pupil and updating the intensity map 702 that is used for the adjustment to the image. In some embodiments, the computing system 102 first determines the intensity map 702 and then adds the values of each pixel of the intended image to the intensity map 702 before displaying the adjusted image 703.

In some embodiments, the storage device 113 may include an intensity map database. In some embodiments, the intensity map database may only include one intensity map. For example, the computing system 102 may monitor or receive information regarding the gaze angle of an eye of a user, pupil size of the user, or the ambient light intensity within the wearable device and determine whether to adjust the image (e.g., not use the intensity map) or to adjust the image using the one intensity map based on predetermined thresholds of the monitored information. For example, in some embodiments, the wearable device may not adjust the image if the pupil size is determined to be within a range (e.g., 2.5 mm-5 mm, or less than 5 mm) and adjust the image using the one intensity map if the pupil size is outside of the range (e.g., greater than 5 mm). In another example, the wearable device may not adjust the image if the intensity of the ambient light within an eyebox of the wearable device is above a predetermined threshold and adjust the image using the one intensity map if the intensity of the ambient light within an eyebox is below the predetermined threshold.

In some embodiments, the pupil size is determined and stored over time to obtain a user profile of pupil size for a particular user. A maximum pupil size and a minimum pupil size can be determined. In some embodiments, an intensity map with maximum positive adjustments corresponds to the maximum pupil size and an intensity map with maximum negative adjustments corresponds to the minimum pupil size. An average pupil size can also be determined and associate with the appropriate intensity map.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A non-transitory computer-readable storage medium coupled to one or more processors, the computer-readable storage medium having instructions encoded thereon that, when executed by the one or more processors, cause the one or more processors to:
   identify a size of a pupil of a user viewing an image presented on a display;
   determine an intensity map based at least on the size of the pupil, wherein the intensity map indicates an amount of adjustment to intensity values of at least a portion of the image, the intensity map comprising an adjustment for certain portions or pixels on the image; and
   adjust the intensity values of at least the portion of the image using the intensity map.

2. The non-transitory computer-readable storage medium of claim 1, further storing program instructions for causing the one or more processors to receive the size of the pupil from an eye tracking system.

3. The non-transitory computer-readable storage medium of claim 1, further storing program instructions for causing the one or more processors to identify the size of the pupil by estimating the size of the pupil based at least on ambient light and an intensity of the image presented on the display.

4. The non-transitory computer-readable storage medium of claim 1, further storing program instructions for causing the one or more processors to determining the intensity map by:
   selecting the intensity map from a plurality of intensity maps, the intensity map corresponding to the size of the pupil, and wherein each of the plurality of intensity maps corresponds to a different size of the pupil.

5. The non-transitory computer-readable storage medium of claim 1, wherein the intensity map indicates a predetermined amount of adjustment to red, green, and blue intensity values of the image to correspond to red, green, and blue intensity values of a reference image.

6. The non-transitory computer-readable storage medium of claim 1, wherein the display further comprises a waveguide and a projection device, the projection device configured to project a light beam toward the waveguide, and the waveguide configured to receive the light beam and present the image on the display.

7. The non-transitory computer-readable storage medium of claim 6, further storing program instructions for causing the one or more processors to adjust the image by transmitting a signal to the projection device of the display, wherein the signal is configured to cause the projection device to adjust at least a portion of a light beam in order to adjust red, green, and blue intensity values corresponding to the portion of the image presented on the display.

8. A non-transitory computer-readable storage medium coupled to one or more processors, the computer-readable storage medium having instructions encoded thereon that, when executed by the one or more processors, cause the one or more processors to:
   identify a size of pupil of a user viewing an image presented on a display;
   determine an intensity map based at least on the size of the pupil, wherein the intensity map indicates an amount of adjustment to intensity values of at least a portion of the image;
   receive a gaze angle of the user from an eye tracking system and determine the intensity map based at least on the size of the pupil and the gaze angle of the user; and
   adjust the intensity values of at least a portion of the image using the intensity map.

9. A non-transitory computer-readable storage medium coupled to one or more processors, the computer-readable storage medium having instructions encoded thereon that, when executed by the one or more processors, cause the one or more processors to:
   identify a size of pupil of a user viewing an image presented on a display;
   select a first intensity map from a plurality of intensity maps, the first intensity map corresponding to a smaller size of the pupil;
   interpolate an intensity map based at least on the size of the pupil and the first intensity map; and
   adjust intensity values of at least a portion of the image using the intensity map.

10. The non-transitory computer-readable storage medium of claim 9, further storing program instructions for causing the one or more processors to determine the intensity map by:
    selecting a second intensity map from the plurality of intensity maps, the second intensity map corresponding to a larger size of the pupil; and
    interpolating the intensity map based on the size of the pupil, the first intensity map, and the second intensity map.

11. The non-transitory computer-readable storage medium of claim 10, wherein the interpolating comprises either a linear interpolation algorithm or a weighted interpolation algorithm.

12. A method of adjusting an image on a display of a wearable device comprising:
    sensing, by a processor of a wearable device, a size of a pupil of a user viewing an image presented on a display;

selecting, by the processor, an intensity map based at least on the size of the pupil, wherein the intensity map is preconfigured to store adjustment values for at least a portion of the image; and adjusting at least the portion of the image using the intensity map.

13. The method of claim 12, wherein determining the intensity map further comprises:

selecting, by the processor from a memory, the intensity map from a plurality of intensity maps, wherein each of the plurality of intensity maps corresponds to a respective size of a pupil.

14. The method of claim 12, wherein the intensity map is a pre-configured map that indicates an amount of red, green, and blue intensity values for adjusting the portion of the image to correspond to red, green, and blue intensity values of a reference image.

15. The method of claim 12, wherein presenting the image on the display comprises:

projecting, via projection device, a light beam toward a waveguide display; and presenting, on the waveguide display, the image corresponding the light beam.

16. The method of claim 15, wherein adjusting the image further comprises, transmitting a signal to the projection device of the display, wherein the signal is configured to cause the projection device to adjust at least a portion of a light beam in order to adjust red, green, and blue intensity values at the portion of the image presented on the display.

17. A method of adjusting an image on a display of a wearable device comprising:

determining, by a processor of a wearable device, a size of a pupil of a user viewing an image presented on a display;

selecting, by the processor from a memory, a first intensity map from a plurality of intensity maps, the first intensity map corresponding to a smaller size of the pupil;

interpolating an intensity map based at least on the size of the pupil and the first intensity map; and adjusting at least a portion of the image using the intensity map.

18. The method of claim 17, wherein determining the intensity map further comprises:

selecting a second intensity map from the plurality of intensity maps, the second intensity map corresponding to a larger size of the pupil; and interpolating the intensity map based on the size of the pupil, the first intensity map, and the second intensity map.

19. A method of adjusting an image on a display of a wearable device comprising:

determining, by a processor of a wearable device, a size of a pupil of a user viewing an image presented on a display;

determining, by the processor, an intensity map based at least on the size of the pupil and a gaze angle of the user; and adjusting at least a portion of the image using the intensity map.

20. A head wearable display comprising:

a housing configured to be worn on a head of a user;

a display of the housing configured to present an image to the user; and one or more processors coupled to a non-transitory computer-readable storage medium having instructions encoded thereon that, when executed by one or more processors, cause the one or more processors to:

determine an intensity map based at least on information regarding a size of a pupil of the user, wherein the intensity map indicates a predetermined amount of adjustment to red, green, and blue intensity values of at least a portion of the image; and adjust the red, green and blue intensity values of at least the portion of the image using the intensity map.

* * * * *